US005482184A

United States Patent [19]

Chang

[11] Patent Number: 5,482,184

[45] Date of Patent: Jan. 9, 1996

[54] NEWSPAPER CONVEYING MECHANISM OF A NEWSPAPER VENDING

[76] Inventor: Wei-Ping Chang, 2F, No. 21-1, Alley 37, Lane 46, 20 Jang Road, Shin Diann City, Taipei Hsien, Taiwan

[21] Appl. No.: 291,677

[22] Filed: Aug. 16, 1994

[51] Int. Cl.[6] .............................. B65G 59/02; B65H 3/36

[52] U.S. Cl. .......................... 221/259; 221/253; 221/218

[58] Field of Search .................................... 221/258, 259, 221/217, 218, 253

[56] References Cited

U.S. PATENT DOCUMENTS

| | | | |
|---|---|---|---|
| 1,813,299 | 7/1931 | Laughlin | 221/258 |
| 2,637,609 | 1/1951 | Berg | 221/259 |
| 3,917,114 | 11/1975 | Grosse | 221/259 |
| 3,964,740 | 6/1976 | Lamb | 221/259 |
| 4,591,069 | 5/1986 | Stewart | 221/253 |
| 4,955,506 | 9/1990 | Schweiberer | 221/218 |
| 5,373,963 | 12/1994 | Hsu | 221/258 |

FOREIGN PATENT DOCUMENTS

| | | | |
|---|---|---|---|
| 106426 | 5/1917 | Italy | 221/259 |

*Primary Examiner*—William E. Terrell
*Assistant Examiner*—Tamara Kelly
*Attorney, Agent, or Firm*—Bacon & Thomas

[57] ABSTRACT

A newspaper conveying mechanism of a newspaper vending machine, including a chain driven by a motor, a set of friction wheels and a driving claw which are locked on the chain at a certain interval. When the mechanism is placed on the surface of a pile of newspapers, the friction wheels previously attach to and frictionally push a single upmost newspaper and then the driving claws grabs the newspaper at folding edges thereof. At this time, the chain is continuously circled to convey the newspaper outside the machine. A joint apparatus is provided to enable the newspaper conveying apparatus to fully attach to the surface of the newspaper for more accurately conveying the newspaper.

2 Claims, 8 Drawing Sheets

NEWSPAPER CONVEYING MECHANISM OF A NEWSPAPER VENDING

BACKGROUND OF THE INVENTION

The present invention relates to a newspaper conveying mechanism of a newspaper vending machine, which includes friction wheels and driving claw means to convey the newspaper at two stages. It is avoided that many newspapers are delivered at the same time. Also, the newspaper is prevented from being torn apart during conveying and is released as an integer.

As shown in FIG. 10, a conventional newspaper vending machine includes a newspaper conveying mechanism 1*a*, a newspaper releasing means 2*a* and an automatic changing mechanism 3*a*. The newspaper conveying mechanism 1*a* utilizes the weight of a main body to depress a pile of newspapers and employs rotary sharp claws 6*a* of a pushing means 5*a* driven by a motor 4*a* to forcedly directly contact with an upmost newspaper and push the same outside the machine.

According to such arrangements, the sharp claws 6*a* directly contact with the surface of the newspaper and are slightly planted thereinto at several points for conveying the newspaper. Due to the pressure of the main body and the stress of the sharp claws 6*a* during rotation, the sharp claws 6*a* tend to damage the surface of the newspaper and imprint a track thereon. Moreover, in case that the motor 4*a* rotates at irregular speed or inappropriate speed, the newspaper may be torn apart. Therefore, it is necessary to provide an improved newspaper conveying mechanism to eliminate the above shortcomings.

SUMMARY OF THE INVENTION

It is therefore a primary object of the present invention to provide an improved newspaper conveying mechanism of a newspaper vending machine, which is able to accurately convey the newspaper without damaging the same. The newspaper conveying mechanism is manufactured with simple structure at low cost and can be easily serviced or maintained. Also, the replacement of the newspaper in this mechanism is facilitated. The mechanism includes a chain driven by a motor, a set of friction wheels and a driving claw means which are locked on the chain at a certain interval. When the mechanism is placed on the surface of a pile of newspapers, the friction wheels previously attach to and frictionally push a single newspaper and then the driving claw means grabs the newspaper at folding edges thereof. At this time, the chain is continuously circled to accurately convey the newspaper outside the machine. Accordingly, the surface of the newspaper will not be damaged. Moreover, because the driving claw means grabs the newspaper after the same is pushed through a certain distance by the friction wheels, it is avoided that many newspapers are delivered simultaneously.

The present invention can be best understood through the following description and accompanying drawing, wherein:

DETAILED DESCRIPTION OF THE PREFERRED EMBODIMENT

Figure 1:
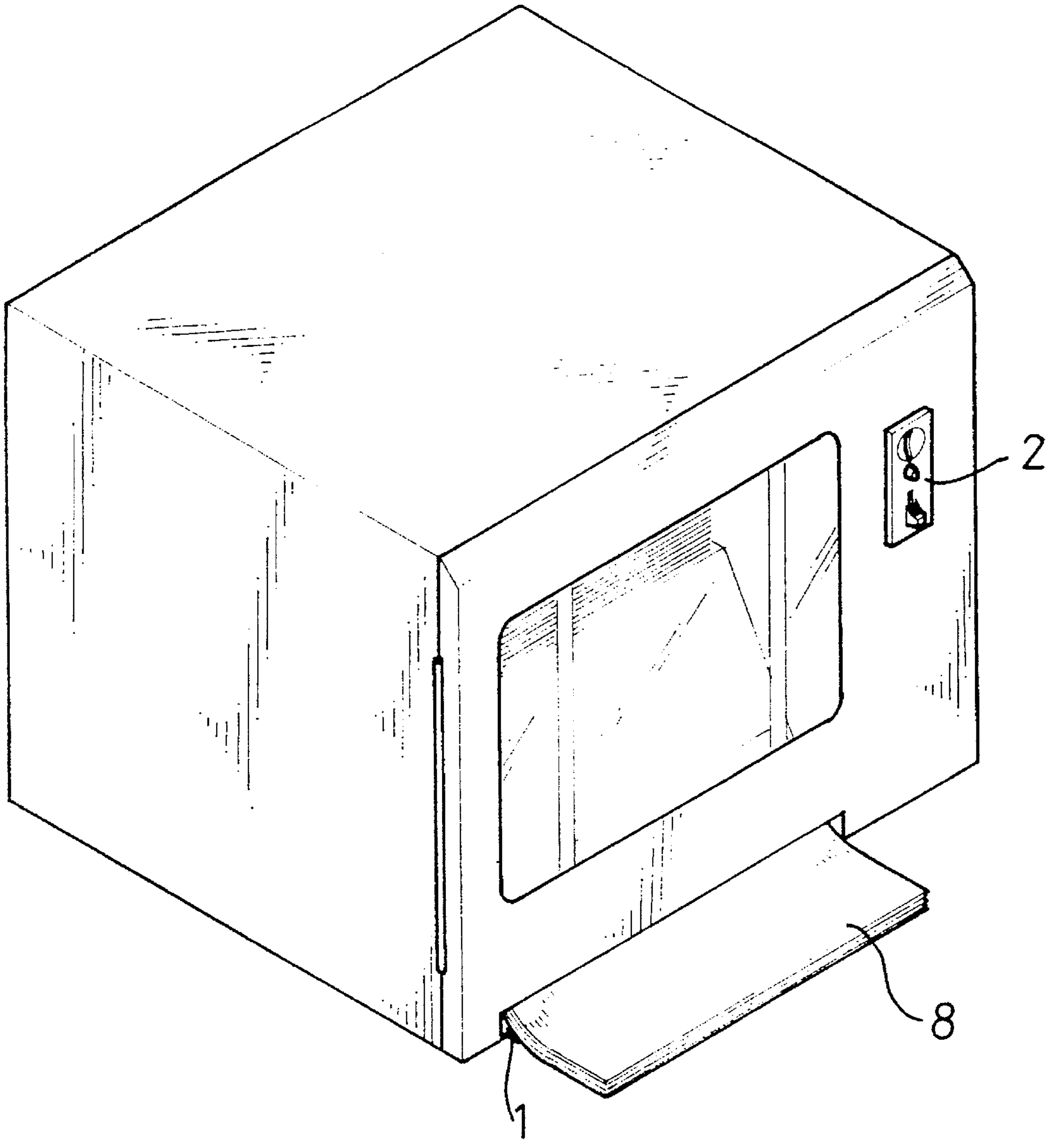
FIG. 1 is a perspective view of a newspaper vending machine.

Please refer to FIG. 1. The newspaper vending machine according to the present invention has a newspaper exit 1 and a coin entrance 2.

Figure 2:
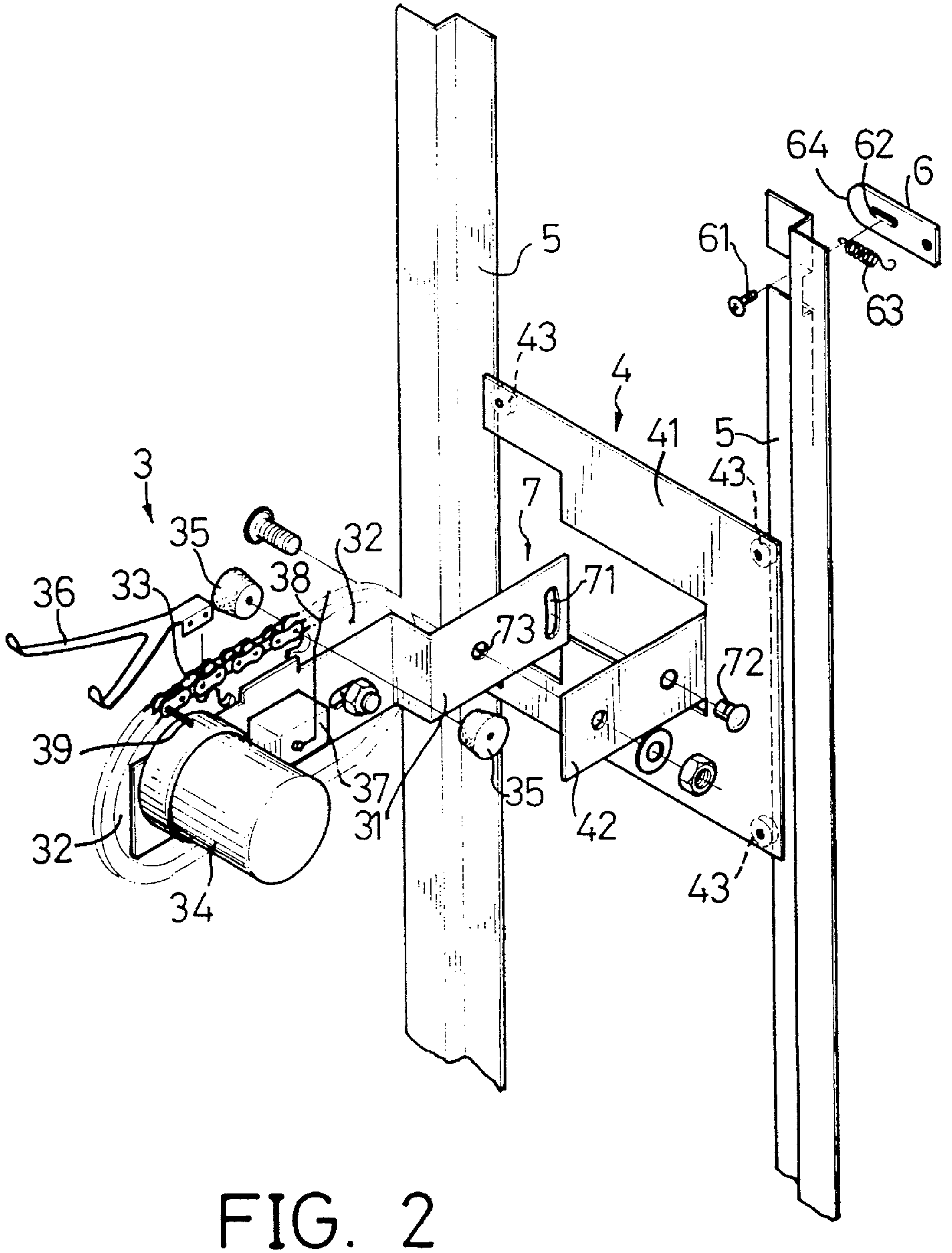
FIG. 2 is a perspective exploded view of the present invention.

Referring to FIG. 2, the present invention includes a newspaper conveying apparatus 3, a sliding assembly 4, two parallel upright rails 5, a locating plate 6 and a joint apparatus 7. The newspaper apparatus 3 includes a fixing seat 31, two gears 32 mounted thereon and a circling chain 33 meshing with the gears 32. One of the gears 32 is engaged with a driving shaft of a motor 34, whereby the chain 33 is able to continuously circle. In addition, a set of friction wheels 35 and a driving claw means 36 are locked on the chain 33 at a certain interval. A microswitch 37 is disposed on one side of the fixing seat 31, having an upward extending controlling rod 38. A driving rod 39 is disposed on the chain 33 near the driving claw means 36, whereby after the chain 33 revolves through one circle, the driving rod 39 touches the controlling rod 38 to switch off the microswitch 37 and cut off the power.

Figure 3:
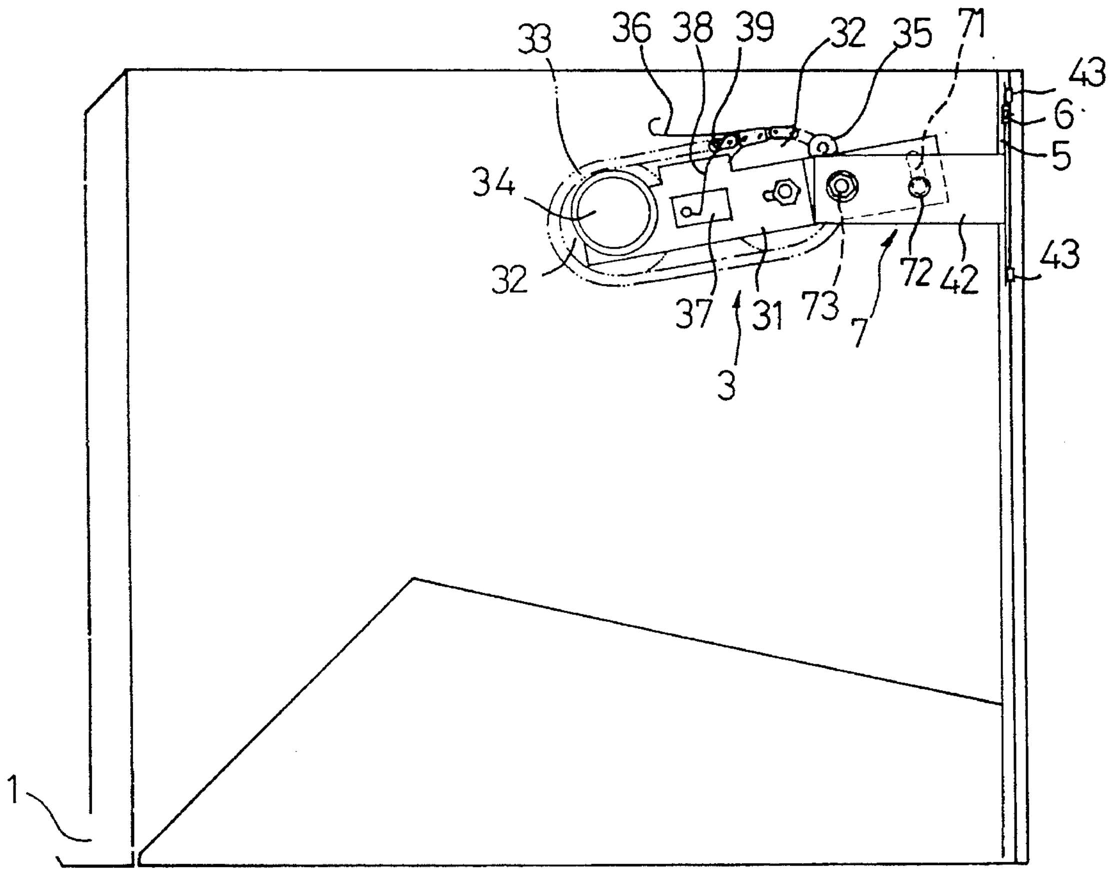
FIG. 3 is a side view showing that the newspaper conveying apparatus is located at an upper end of the rail.

The fixing seat 31 is locked on a projecting plate 42 of a fixing board 41 of the sliding assembly 4 at through holes 73 thereof by a screw and a nut. Four rollers 43 are respectively disposed on four corners of the fixing board 41, whereby the fixing board 41 are vertically slidably mounted on the rails 5 so that the newspaper conveying apparatus 3 is able to move up and down along the rails 5 for facilitating the replacement of the newspaper. In addition, the locating plate 6 is resiliently mounted on upper ends of the rails 5 for engaging with the fixing board 41 and locating the newspaper conveying apparatus 3 at the upper ends of the rails 5 as shown in FIG. 3. The joint apparatus 7 is disposed between the fixing seat 31 and the projecting plate 42, whereby the newspaper conveying apparatus 3 can be adjusted within a certain angle as shown in FIG. 3. An arch slot 71 is formed on a rear portion of the fixing seat 31 and a pin 72 passes through one side of the projecting plate 42 into the arch slot 71, whereby the newspaper conveying apparatus 3 can be pivoted about the screw at the through holes 73 within a range defined by the arch slot 71. Therefore, by means of the joint apparatus 7, the newspaper conveying apparatus 3 can be adjusted according to the height of a pile of inclined newspapers 8 so as to keep fully attaching thereto and exerting a frictional conveying force thereon.

Figure 5:
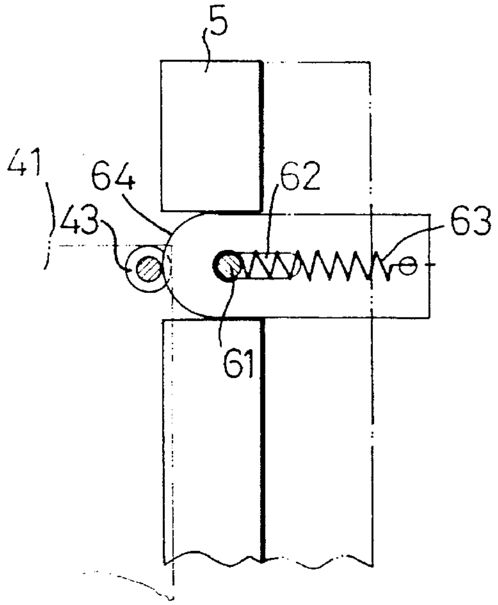
FIG. 5 shows that the locating plate is pushed and retracted by the roller.
Figure 6:
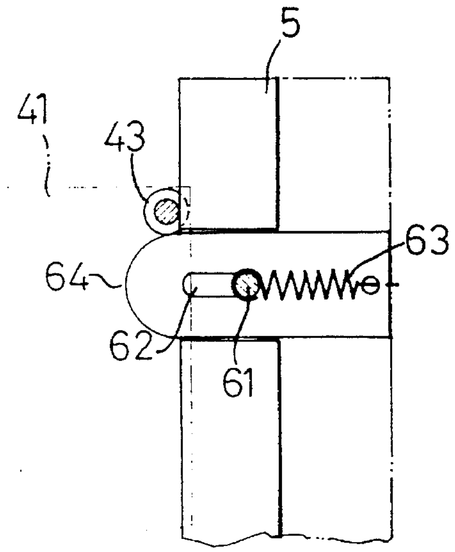
FIG. 6 shows that the locating plate is returned with the roller moving to a position above the locating plate.
Figure 4:
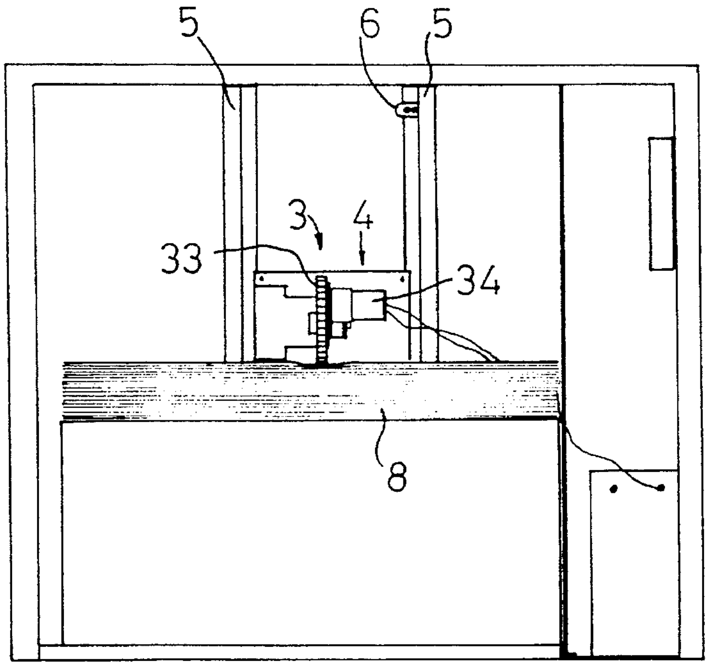
FIG. 4 is a front view showing that the newspaper conveying apparatus is positioned on a pile of newspapers.

Please refer to FIGS. 2 to 6. The locating plate 6 is formed with an elliptic slot 62, whereby a screw 61 can pass through the slot 62 to transversely lock the locating plate 6 on the rail 5. A spring 63 is connected between the screw 61 and the locating plate 6, permitting the locating plate 6 to transversely resiliently displace within a notch of the rail 5 as shown in FIGS. 5 and 6. Also, the locating plate 6 has a semicircular front end 64, whereby when the rollers 43 of the fixing board 41 move upward to the locating plate 6, one of the rollers 43 resiliently pushes and retracts the locating plate 6 into the notch of the rail 5 along the semicircular front end 64 as shown in FIG. 5. After the roller 43 passes over a middle point of the semicircular front end 64, the locating plate 6 is resiliently returned as shown in FIG. 6 to locate the newspaper conveying apparatus 3 at an upper end of the rail 5 as shown in FIG. 3. However, when a downward force is slightly exerted on the fixing board 41, the roller 43 again pushes and retracts the locating plate 6 into the notch along the semicircular front end 64. At this time, the fixing board 41 as well as the newspaper conveying apparatus 3 are moved downward as shown in FIG. 4.

Figure 7:
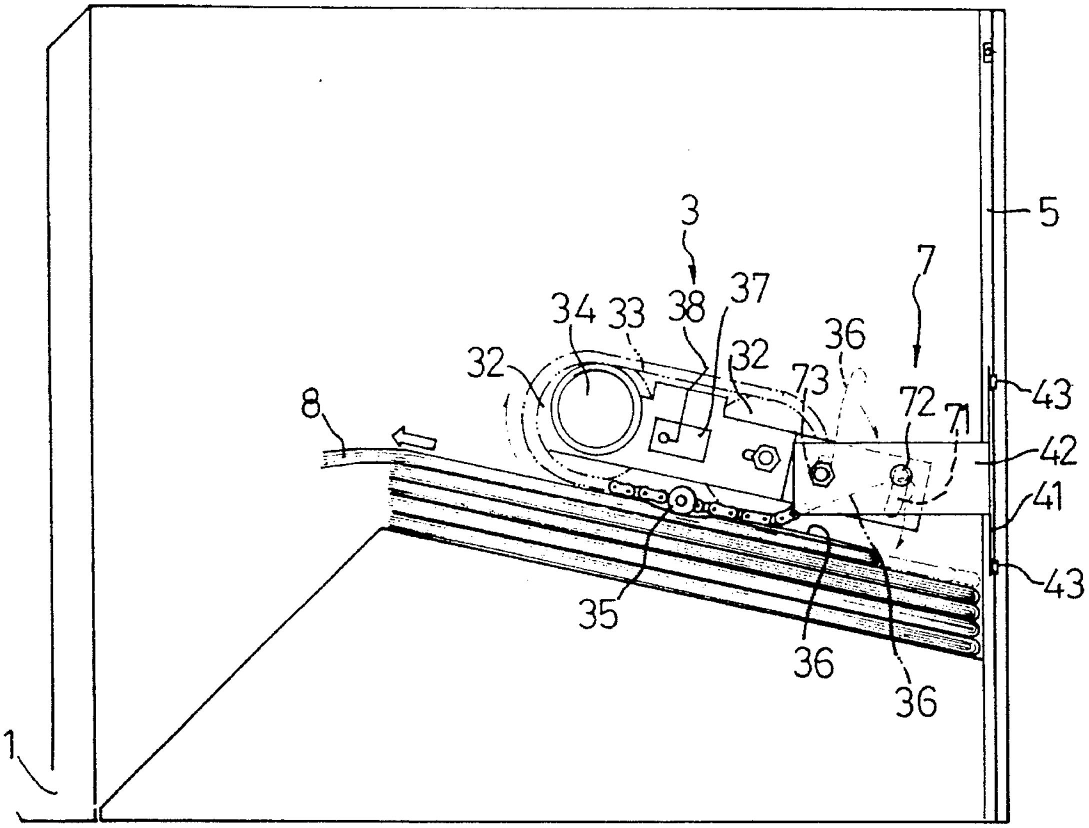
FIGS. 7 to 9 show continuous newspaper conveying operation of the present invention.
Figure 8:
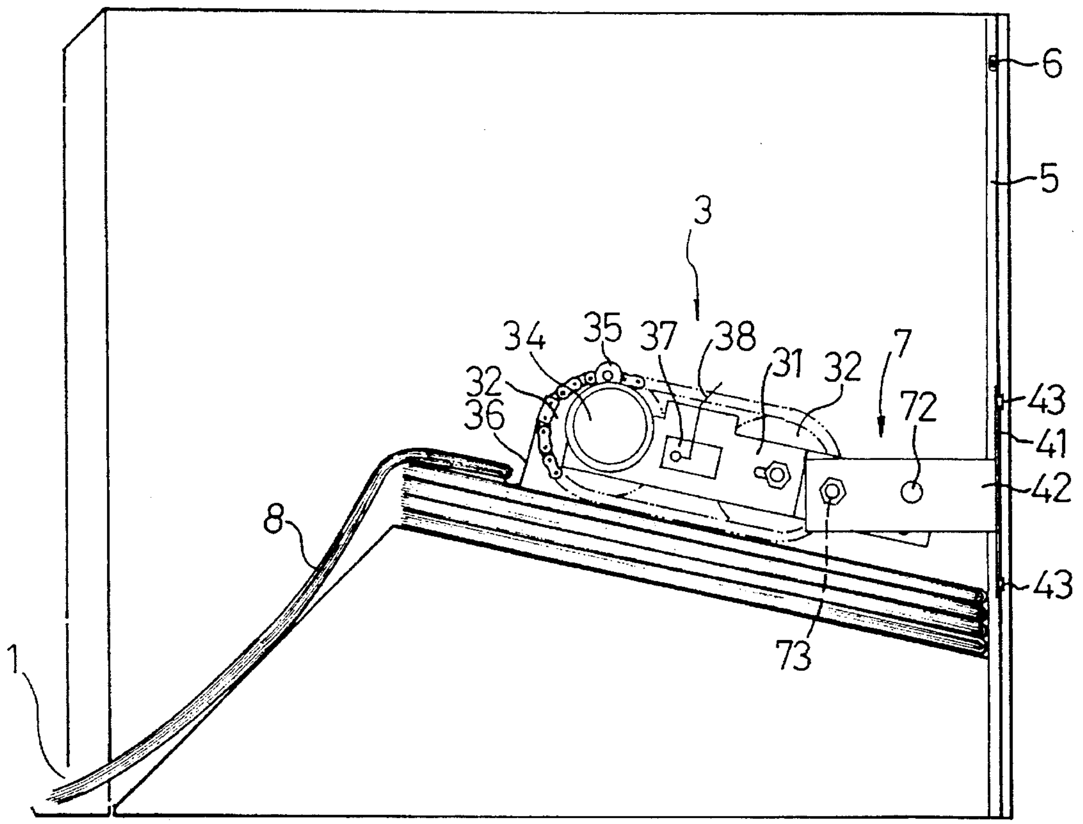
Figure 9:
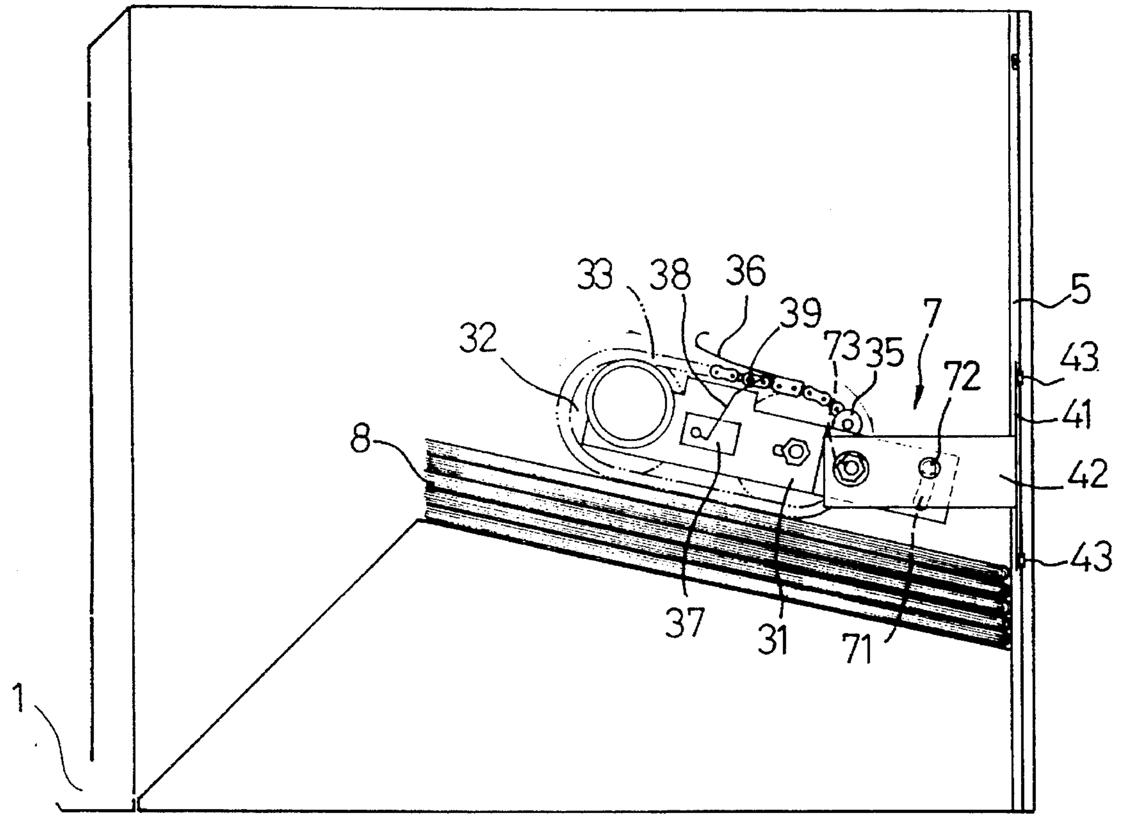
Figure 10:
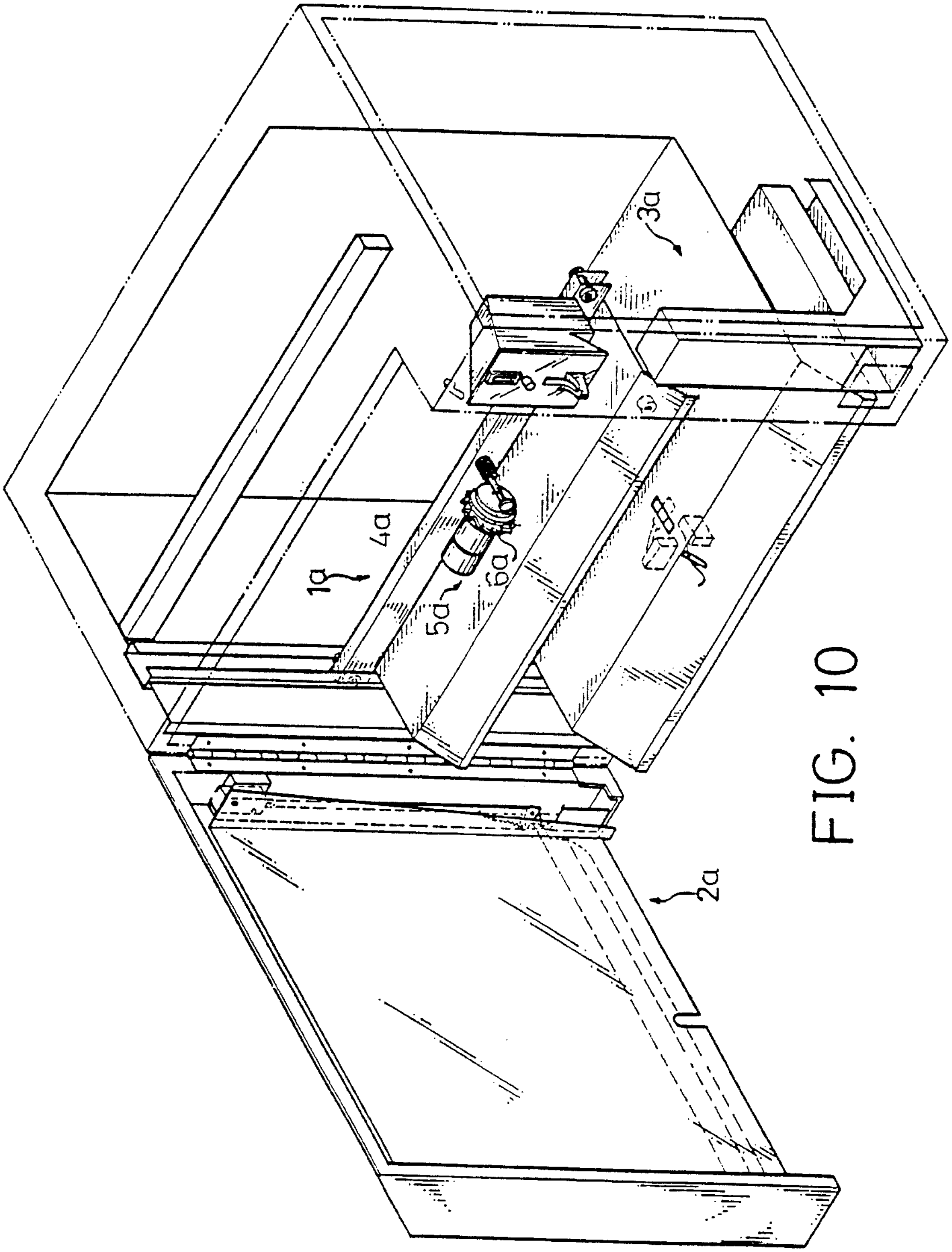
FIG. 10 shows a conventional newspaper vending machine.

Please now refer to. FIGS. 7 to 9. When the motor 34 is actuated to drive the chain 33 to circle, the friction wheels 35 first touch the surface of the upmost newspaper 8 and frictionally push the same. The friction wheels 35 are made of materials that contact the newspaper with a frictional force larger than that between two newspapers. Preferably in this embodiment, the friction wheels 35 are made of rubber. Then, after the newspaper is pushed forward by the friction wheels 35 through a certain distance, the chain 33 continuously circles and the driving claw means 36 behind the friction wheels 35 grabs a rear folding edge of the newspaper as shown in FIG. 8 to accurately push the newspaper forward until the same passes through the newspaper exit 1 of the newspaper vending machine. By means of the two-stage conveying operation, it is avoided that the driving claw means 36 grabs more than one newspaper 8 due to varying thickness thereof. After the newspaper conveying apparatus 3 completely revolves through one circle and is located as shown in FIG. 9, the driving rod 39 disposed behind the driving claw means 36 touches the controlling rod 38 of the microswitch 37 to cut off the power and stop the newspaper conveying apparatus 3. Next insertion of a coin will re-start one circle of the conveying operation.

It is to be understood that the above description and drawings are only used for illustrating one embodiment of the present invention, not intended to limit the scope thereof. Any variation and derivation from the above description and drawings should be included in the scope of the present invention.

What is claimed is:

1. A newspaper conveying mechanism of a newspaper vending machine, comprising a newspaper conveying apparatus, a sliding assembly, two parallel upright rails, a locating plate and a joint apparatus, wherein:

the newspaper apparatus includes a fixing seat, two gears mounted thereon and a circling chain meshing with the gears, one of the gears being engaged with a driving shaft of a motor, whereby the chain is able to continuously circle, a set of friction wheels and a driving claw means being locked on the chain at a certain interval, a microswitch being disposed on one side of the fixing seat, having an upward extending controlling rod, a driving rod being disposed on the chain near the driving claw means, whereby after the chain revolves through one circle, the driving rod touches the controlling rod to switch off the microswitch and cut off power;

the sliding assembly includes a fixing board and four rollers respectively disposed on four corners of the fixing board, wherein the fixing board is vertically slidably mounted on the rails by means of the four rollers, the fixing board having a projecting plate on which the fixing seat is fixed by a screw;

the joint apparatus is disposed between the fixing seat and the projecting plate, including an arch slot formed on a rear portion of the fixing seat and a pin passing through one side of the projecting plate into the arch slot, whereby the newspaper conveying apparatus is pivotable about the screw which fixes the fixing seat on the projecting plate within a range defined by the arch slot;

the locating plate is formed with an elliptic slot, whereby a screw is passed through the slot to transversely lock the locating plate on an upper end of one of the rails, a spring being connected between the screw and the locating plate, permitting the locating plate to transversely resiliently displace within a notch of the rail, the locating plate having a semicircular front end, whereby one of the rollers is able to transversely push and retract the locating plate into the notch of the rail along the semicircular front end.

2. A newspaper conveying mechanism as claimed in claim 1, wherein the friction rollers are made of rubber.

* * * * *